(12) United States Patent
Körber et al.

(10) Patent No.: US 7,017,809 B2
(45) Date of Patent: Mar. 28, 2006

(54) READING DEVICE FOR DIFFERENT TYPES OF CARDS

(75) Inventors: Matthias Körber, Fürth (DE); Ralf Slawik, Nürnberg (DE); Uwe Wolff, Nürnberg (DE)

(73) Assignee: Grundig Multimedia B.V., Amsterdam (NL)

( * ) Notice: Subject to any disclaimer, the term of this patent is extended or adjusted under 35 U.S.C. 154(b) by 0 days.

(21) Appl. No.: 10/488,563

(22) PCT Filed: Aug. 31, 2002

(86) PCT No.: PCT/EP02/09753

§ 371 (c)(1),
(2), (4) Date: Sep. 14, 2004

(87) PCT Pub. No.: WO03/021522

PCT Pub. Date: Mar. 13, 2003

(65) Prior Publication Data

US 2005/0040233 A1   Feb. 24, 2005

(30) Foreign Application Priority Data

Sep. 4, 2001   (DE) ............................... 101 43 309

(51) Int. Cl.
*G66K 7/00* (2006.01)

(52) U.S. Cl. .................. 235/440; 235/451; 235/441

(58) Field of Classification Search ........ 235/439–441, 235/380, 382, 451, 485–487, 492; 340/5.6, 340/5.74

See application file for complete search history.

(56) References Cited

U.S. PATENT DOCUMENTS

| | | | | |
|---|---|---|---|---|
| 5,750,973 A | * | 5/1998 | Kaufman et al. | 235/441 |
| 5,878,134 A | * | 3/1999 | Handelman et al. | 340/5.6 |
| 6,069,795 A | * | 5/2000 | Klatt et al. | 361/737 |
| 6,137,710 A | * | 10/2000 | Iwasaki et al. | 365/52 |
| 6,151,511 A | * | 11/2000 | Cruciani | 455/558 |
| 6,561,421 B1 | * | 5/2003 | Yu | 235/451 |
| 6,666,724 B1 | * | 12/2003 | Lwee | 439/630 |
| 6,672,904 B1 | * | 1/2004 | Chen | 439/631 |
| 6,716,066 B1 | * | 4/2004 | Kuo | 439/630 |
| 6,776,345 B1 | * | 8/2004 | Liang | 235/486 |
| 6,817,523 B1 | * | 11/2004 | Chen et al. | 235/441 |
| 6,830,194 B1 | * | 12/2004 | Hsiao | 235/492 |
| 6,863,571 B1 | * | 3/2005 | Sato et al. | 439/630 |
| 2001/0019077 A1 | * | 9/2001 | Buschmann | 235/439 |
| 2002/0194129 A1 | * | 12/2002 | Furuya et al. | 705/41 |

* cited by examiner

*Primary Examiner*—Thien M. Le
*Assistant Examiner*—Edwyn Labaze
(74) *Attorney, Agent, or Firm*—Quarles & Brady LLP

(57) ABSTRACT

The invention relates to a reading device for types of different-sized cards. The aim of the invention is to be able to use the types of cards in a selective manner. At least two identical trays (4,5) comprising readers (11,12) are provided for both types of cards. An adapter (20) having outer dimensions corresponding to the largest-size type of card is used to introduce a smaller-size card.

10 Claims, 5 Drawing Sheets

READING DEVICE FOR DIFFERENT TYPES OF CARDS

This application is a 371 of PCT/EP02/09753 filed on Aug. 31, 2002.

FIELD OF THE INVENTION

The invention concerns a reading device for card types of different size. Such reading devices can be integrated, for example, in car radios, which, in addition to the actual radio reception, may serve for mobile telephone use and/or navigation or other functions.

BACKGROUND ART

According to the state of the art, in the case of mobile telephones, SIM (Subscriber Identification Module) cards are used for user identification. The assigned reader has a tray which is adapted to the size of SIM cards. A push/push function for locking and unlocking the SIM card in the tray is problematic because then the SIM cards protrude only about 2 mm from the opening of the tray and thus are difficult to handle.

Furthermore, SD cards are known as storage medium. They are suitable for storing music, for example, in the MP3 format, driver's log data and/or navigational data. The operation with data recall or data input can be done through keys, knobs or multifunctions of the operating elements provided in a car radio.

A reader for an SD card has a tray into which the SD card can be inserted only in the correct position, which is achieved by appropriate design of the guides provided on the tray and on the edges of the SD card. In this case, a push/push function for locking and unlocking the SD card in the corresponding reader presents no problem for the user.

The cards of the first type, especially SIM cards, have a smaller size than the cards of the second type, especially SD cards. Correspondingly, the opening slits of the reader also have a different width and, optionally, a different height.

In vehicles, especially integrated in car radios, both of the above card types or similar card types should be able to be used for communication, information or entertainment. It is not preferable to provide two separate reading devices for these, for reasons of placement and design. In addition, there is a danger that, inadvertently, the user will insert the SIM card, which is smaller than the SD card, into the tray of the SD reader and then the card will disappear.

DE 43 36 522 C2 describes a card reader/writer device for common use of cards which are not touched or are touched. The cards serve for access control and are required by the reading device.

In DE 199 25 076 A1, a double SIM card reader is described. There is no provision for reading of cards of a different size.

Card-reading devices for chip cards and/or SIM cards with different thickness are known from DE 195 16 987 A1 and DE 199 30 389 A1. Apart from their thickness, the cards to be recognized have the same size.

In the publication MID 2000 Molded Interconnect Devices, 4th International Congress, Sep. 27–28, 2000, Erlangen Germany, ISBN 3-87525-135-0, it is described that, using the MID technology, three-dimensionally structured switches can be produced and that, in these, conducting paths can be applied on a three-dimensionally designed plastic part that can serve as carrier.

The task of the invention is to propose a reading device of the type mentioned at the outset, which is constructed so that both or several types of cards can be used alternatively.

SUMMARY OF THE INVENTION

According to the invention, the above task is solved by the characteristics of the reading device which is described as follows. In the same trays, a card type of larger size (SD card) and the card type of smaller size (SIM card) can be inserted alternatively. Here, the larger card type can be inserted directly into one of the trays—without adapter—and the other type of card, of smaller size, is held in the adapter and inserted into one of the trays. Since readers are arranged in each of the trays for one or the other type of card, the various card types can be evaluated in each of the trays. Thus, the user does not have to pay attention as to which tray is assigned to which type of card. The same functional result is obtained independently of whether the particular card is inserted into one or the other tray.

Since the two trays are identical, their opening slit is also the same, which permits a clear design for the reading device.

Preferably, the reading device is designed so that the card of larger size is an SD card and the card of smaller size is an SIM card.

Preferably, the trays are designed in such a way that locking and unlocking the card of larger size and the card of smaller size, carrying the adapter, is done by a push/push function. In this way, it is achieved that, even the cards of smaller size, carried by the adapter, can be simply locked and unlocked with a push/push function.

Other advantageous embodiments of the invention follow from the description of a practical example given below.

DETAILED DESCRIPTION

Figure 1:
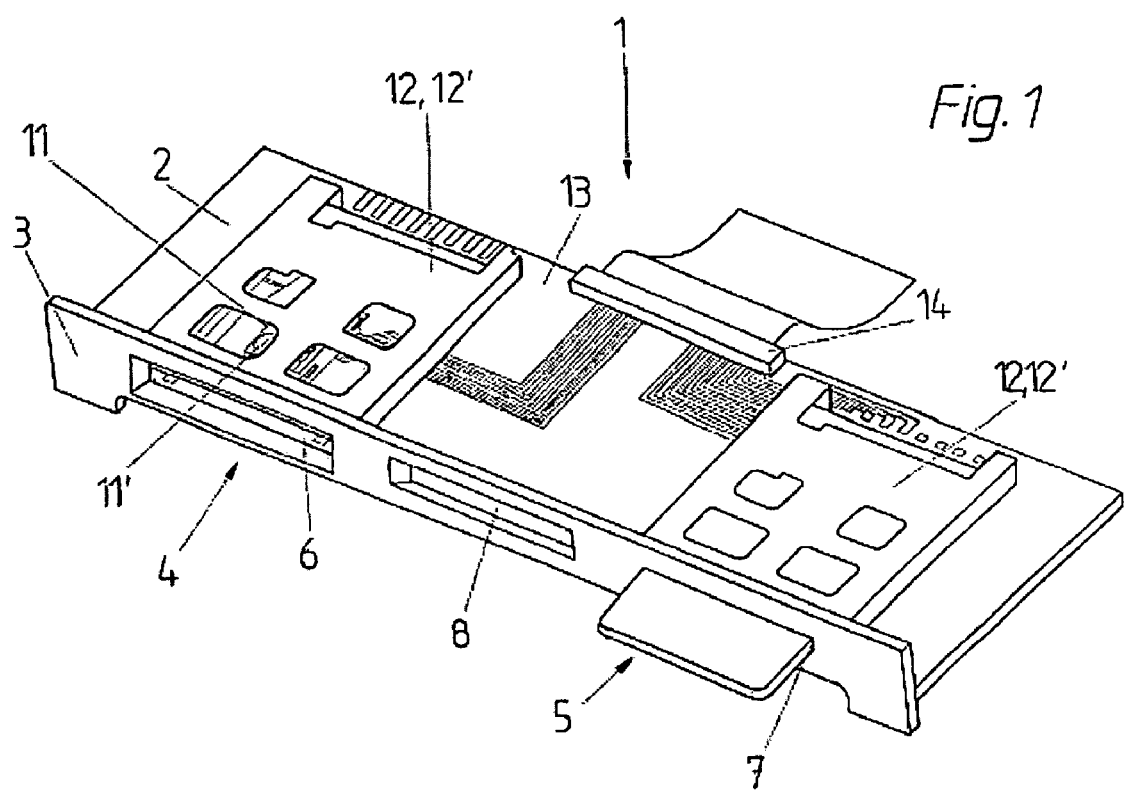
FIG. 1 is a perspective view of a reading device, in which an SD card or an adapter is shown partially inserted into the tray.

A reading device 1, which is suitable for incorporating into a vehicle together with a car radio, has a base carrier 2 with a shutter strip 3 (see FIG. 1), which can be a part of a shutter of the car radio.

A left tray 4 and a right tray 5 are provided in the reading device 1. The two trays 4, 5 have the same construction. A slit 6, 7 of shutter 3 is assigned to each of trays 4, 5. A field 8 is provided between slits 6, 7, in which a light sensor can be arranged for controlling the illumination brightness of the car radio and/or an infrared interface can be installed.

Figure 2:
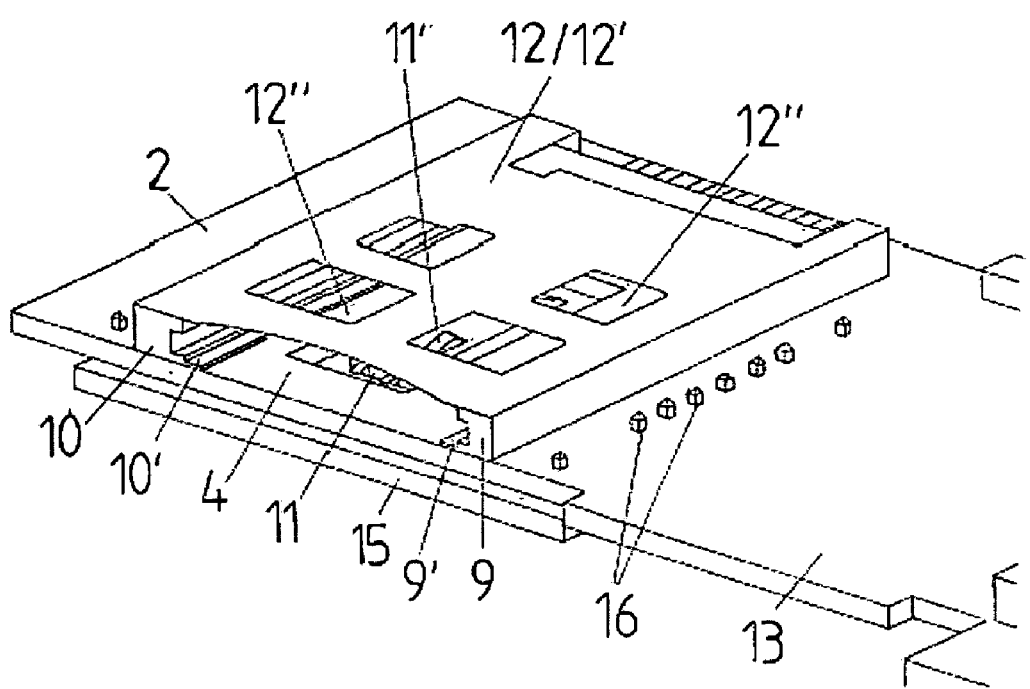
FIG. 2 is an enlarged partial view of the left tray in FIG. 1.
Figure 3:
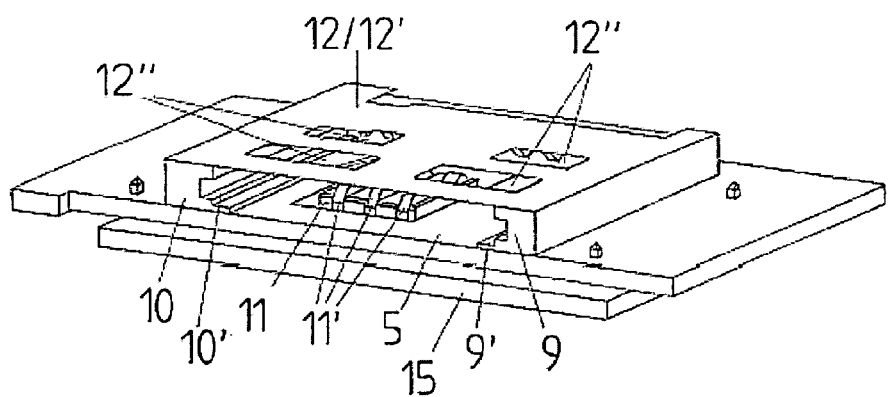
FIG. 3 is an enlarged partial view of the right tray in FIG. 1.

Each of the two trays 4, 5 has a right guide edge 9 and a left guide edge 10. On each of the two trays 4, 5, on one side a reader 11 is provided for a type of card of small size, especially an SIM card and a reader 12 on the other side, for a type of card of larger size, especially an SD card. FIGS. 1 to 3 show contact elements 11' of reader 11, which contact any inserted SIM card. Only the base plate 12' is shown for reader 12 in FIGS. 1 to 3; in order to simplify the drawing, the elements that sense the SD card are not shown. They act through one or several openings 12" of base plate 12' in the particular tray 4, 5.

According to FIGS. 2 and 3, the base carrier 2 has a first circuit board 13 with a common pinboard 14. Reader 12 is contacted with circuit board 13. In another circuit board plane, circuit boards 15 are arranged on circuit board 13, each of which carries reader 11 for the SIM cards assigned to tray 4 or 5. Wiring pins 16 connect circuit boards 15 with circuit board 13. However, it is possible to construct the base carrier 2 using MID technology. Then the base carrier 2 is a three-dimensionally formed plastic structural part, which forms two planes of circuit boards which carry the two readers 11, 12 assigned to tray 4 and the two readers 11, 12 assigned to tray 5. Readers 11, 12 are essentially contact elements which contact the particular cards and which are electrically connected to pinboard 14.

Figure 4:
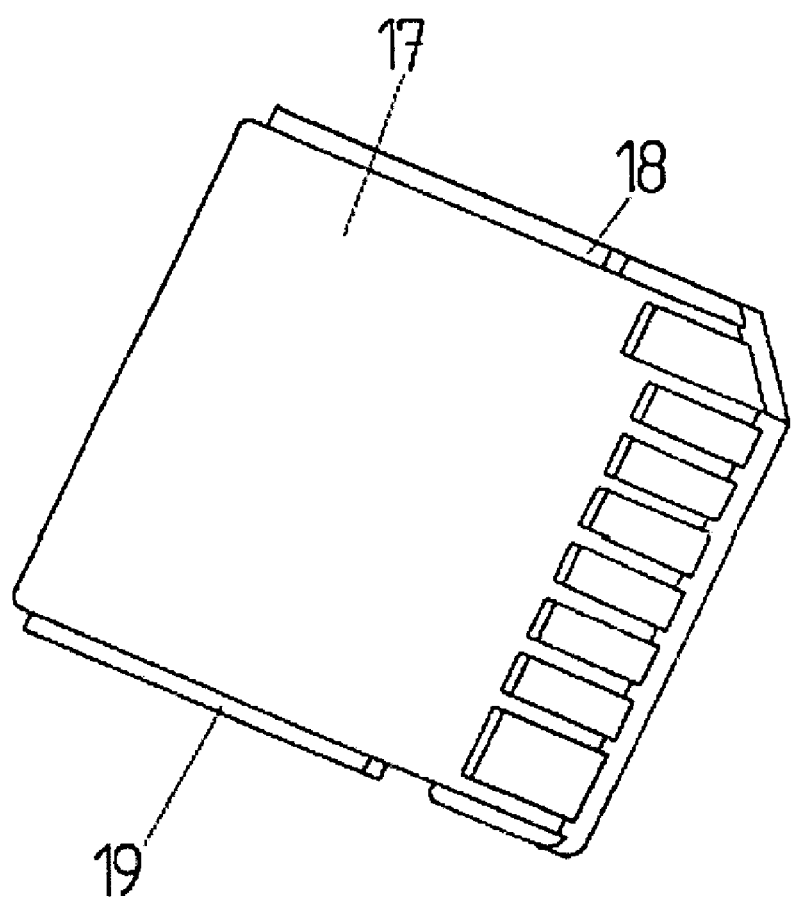
FIG. 4 is an SD card.

Trays 4, 5 are designed in such a way that the known SD card 17 (see FIG. 4) and the adapter 20 described below can be pushed into it with a push/push function, can be locked and unlocked and removed from it.

The SD card 17 has a stepped profile on its outer edges 18, 19. A corresponding stepped structure 9', 10' is provided in the guide edges 9, 10 of trays 4, 5. This ensures that the SD card 17 can be inserted only in the correct position into one or the other tray 4, 5 in such a way that it acts on the reader 12 assigned to it.

Figure 5:
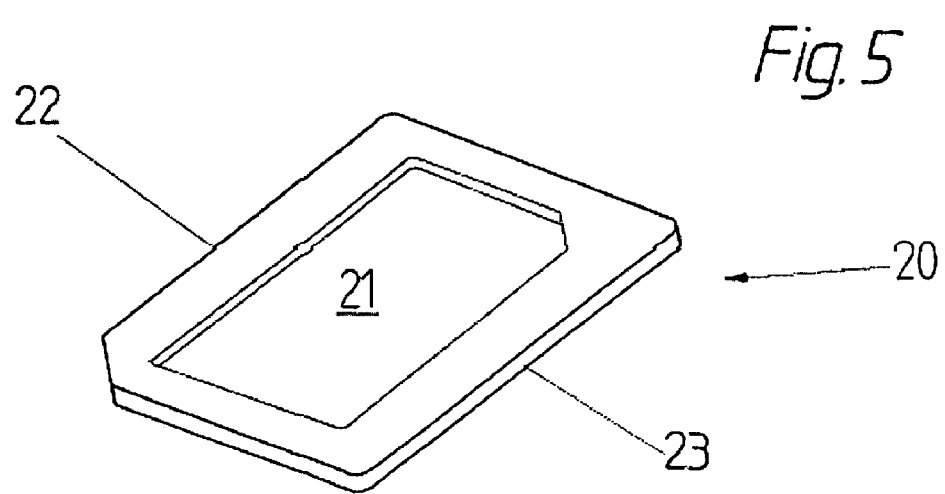
FIG. 5 is an adapter for an SIM card.

An adapter 20 (see FIG. 5) is provided for holding an SIM card. For this purpose, adapter 20 has a recess 21, the inside shape of which is adapted to the outer shape of the SIM card, so that an SIM card can be inserted into adapter 20 only in the correct position.

The outer shape of adapter 20 is the same as the outer shape of SD card 17. The outer edges 22, 23 of adapter 20 have a stepped structure which corresponds to the stepped structure on the outer edges 18, 19 of the SD card 17. Thus adapter 20 can be inserted into one or the other tray 4, 5 only in the correct position, and the SIM card is assigned in the correct position to the reader 11 provided for it.

When a user wishes to use an SIM card, he/she pushes it—placed in adapter 20—optionally into the left tray 4 or right tray 5. The user can then insert the SD card into the other tray. Therefore, the user does not have to be concerned with inserting the SIM card and SD card into the correct trays. Both trays 4, 5 are suitable for insertion of an SD card as well as for insertion of an SIM card in adapter 20.

What is claimed is:

1. Reading device for a first card type and a second card type of different sizes, wherein at least two identical trays (4, 5) are provided and sized for accepting the first card type, which is of a larger size than the second card type, wherein in each tray (4, 5) at least two respective readers (11, 12) are arranged for reading both cards of the first card type and the second card type, respectively, and wherein an adapter (20) having outside dimensions is provided for one of the two identical trays (4, 5), the outside dimensions of said adapter corresponding to the larger size of the first card type and said adapter having a recess (21) which is adapted to the dimension of the second card type of smaller size.

2. Reading device according to claim 1, wherein the first card type of larger size is an SD card (17) and wherein the second card type of smaller size is a SIM card type.

3. Reading device according to claim 1, wherein slits (6, 7) of equal size of a shutter strip (3) are assigned to the trays (4, 5).

4. Reading device according to claim 1, wherein the trays (4, 5) are designed in such a way that locking and unlocking of the card (17) of larger size and of the adapter (20) carrying the card of smaller size is accomplished with a push/push function.

5. Reading device according claim 1, the card type (17) of larger size and the adapter (20) have a stepped profile on their edges (18, 19; 22, 23), parallel to a direction of insertion, which is adapted to the stepped structure (9', 10') of guide edges (9, 10) of trays (4, 5).

6. Reading device according claim 1, wherein in both trays (4, 5) the reader (11) is provided on one side for one type of card and reader (12) is provided on an opposite side for the other type of card.

7. Reading device according to claim 1, wherein the adapter (20) is designed in such a way that the card of smaller size inserted into the adapter (20) faces the reader (11) provided for the adapter (20).

8. Reading device according to claim 1, wherein the readers (11, 12) for different card types are arranged in parallel circuit board planes.

9. Reading device according to claim 8, wherein the reader (12) and the other readers (11) are arranged on circuit boards (15), parallel to circuit board (13), where these circuit boards (15) are mounted on circuit board (13).

10. Reading device according to claim 8, wherein the circuit board planes are formed from a three-dimensionally shaped plastic part onto which conducting paths for readers (11, 12) are applied.

\* \* \* \* \*